(12) United States Patent
Urbach et al.

(10) Patent No.: US 6,516,603 B1
(45) Date of Patent: Feb. 11, 2003

(54) GAS TURBINE ENGINE SYSTEM WITH WATER INJECTION

(75) Inventors: Herman B. Urbach, Annapolis, MD (US); Philip Levine, Bourne, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 22 days.

(21) Appl. No.: 09/874,947

(22) Filed: Jun. 6, 2001

(51) Int. Cl.$^7$ ................................................ F02C 3/30
(52) U.S. Cl. ........................ 60/39.3; 60/39.53; 60/728
(58) Field of Search ........................... 60/39.25, 39.26, 60/39.3, 39.53, 39.59, 775, 728

(56) References Cited

U.S. PATENT DOCUMENTS

| | | | |
|---|---|---|---|
| 4,418,527 A | * 12/1983 | Schlom et al. | ................. 60/775 |
| 4,509,324 A | 4/1985 | Urbach et al. | |
| 4,702,074 A | * 10/1987 | Munk | ......................... 60/39.53 |
| 5,193,337 A | * 3/1993 | Harboe et al. | .............. 60/39.25 |
| 5,329,758 A | 7/1994 | Urbach et al. | |
| 5,867,977 A | 2/1999 | Zachary et al. | |
| 5,930,990 A | 8/1999 | Azchary et al. | |

OTHER PUBLICATIONS

"LM6000 Sprint Design Enhanced to Increase Power and Efficiency", Gas Turbine World Jul.–Aug. 2000.
Wilcox, E. Clinton, and Trout, Arthur A., NACA Report 1006, "Analysis of Thrust Augmentation of Turbojet Engines by Water Injection at the compressor Inlet Including Charts for Calculating Compression Processes with Water Injection," (1950).
Urbach et al., "The Reduction of $NO_x$ Emissions from Marine Power Plants," presented before the Air & Waste Management Association's $90^{th}$ Annual Meeting & Exposition<Jun. 8–13, 1997, Toronto, Canada.
Gas Turbine World 1999–2000 Handbook, p. 36, Pequot Publishing Co.

\* cited by examiner

Primary Examiner—Louis J. Casaregola
(74) Attorney, Agent, or Firm—Jacob Shuster

(57) ABSTRACT

A gas turbine engine is energized by a controlled supply of fuel thereto for operation under regulated conditions increasing efficiency and power output per unit mass of air under pressurized flow from a compressor to which the air is supplied with water droplets at a ratio predetermined to reduce operational temperature within the turbine engine. Operational conditions are also regulated by angular adjustment of the stator blades in the turbine stages of the gas turbine engine through which the pressurized flow of combustion products is conducted, so as to maintain a maximum inlet temperature arranged to maximize part-load efficiency.

8 Claims, 3 Drawing Sheets

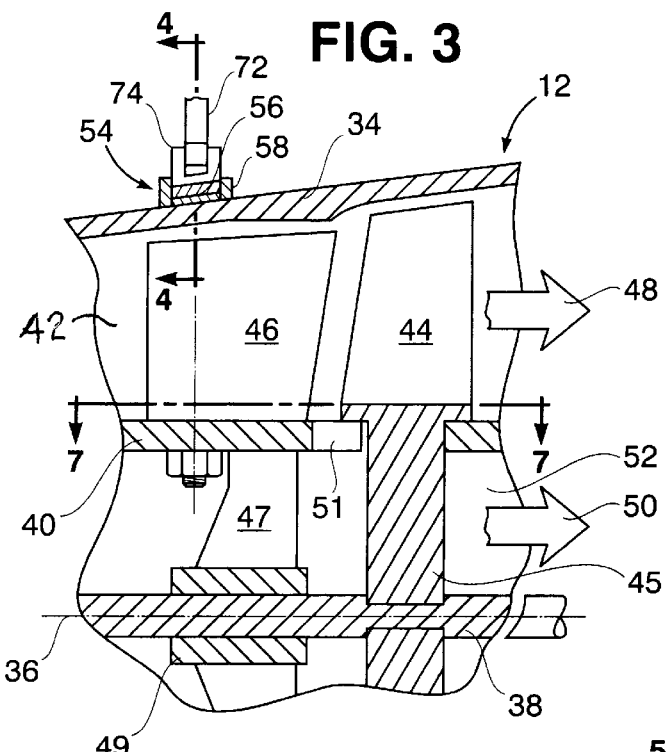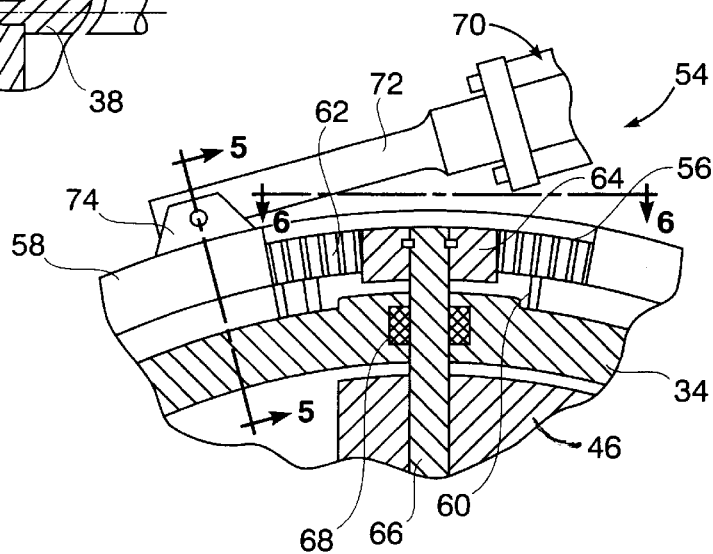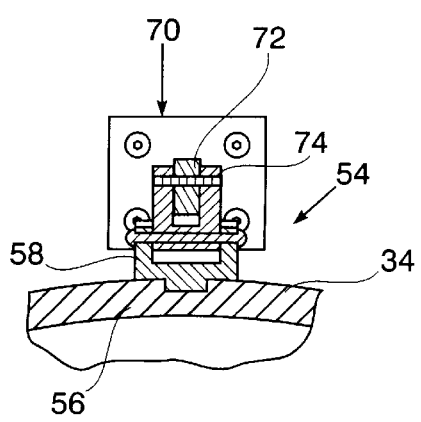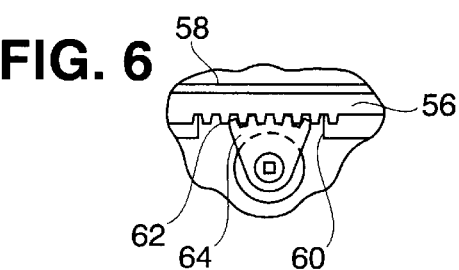

GAS TURBINE ENGINE SYSTEM WITH WATER INJECTION

The present invention relates generally to gas turbine power generation.

BACKGROUND OF THE INVENTION

On hot days, water fog injection at the inlet of a gas turbine is often practiced to cool the air with significant enhancements of power and efficiency. However, the cooling is only moderately effective in increasing efficiency at part load where mobile and marine power systems must generally operate. Power generation and propulsion installations involving gas turbine engines on-board naval marine vessels operating under part-load conditions cannot maintain low fuel consumption when fuel throttle flow control is the only available facility for such purpose. Fuel control only for such purpose is ineffective because airflow decreases more slowly than fuel flow as power is reduced so that the combustion temperature falls, which results in a high fuel consumption rate and lower efficiency. Injection of waterfog increases the power per unit of airflow so that less air is required for the same power. A large airflow through the gas turbine engine for power generation necessitates large inlet and exhaust ducting air stacks mounted high on the ship superstructure. Volumetrically massive and tall air stacks create poor sea keeping conditions on high seas and the increased radar cross-section contributes to naval ship vulnerability and to depletion of available deck space for weapons systems. It is therefore one objective of the present invention is to provide a gas turbine engine, which enhances the ratio of power to airflow therethrough under all loading conditions. Another objective is to increase overall efficiency of the gas turbine engine and reduce its fuel consumption, especially under partial loading conditions thereby increasing operational range. Also, improvement in operational and naval tactical capabilities of a naval ship and a reduction in its operational fuel costs are to be thereby achieved by the present invention.

SUMMARY OF THE INVENTION

In accordance with the present invention, the temperature of air required to generate power through a gas turbine engine is reduced by evaporatively cooling the compressor inlet air by water-fog injection of droplets through available nozzles at the compressor inlet. The size of the droplets and the ratio of water to the air is limited to a degree that will not cause degradation in the life and capability of the engine. Variable-area turbine nozzles control the airflow to maintain the design fuel-air ratio. A fuel valve controls the supply of fuel to assist in maintaining such fuel-air ratio and to achieve an optimum turbine-inlet temperature for low fuel consumption. The water-fog injector has water spray nozzles connected through control valves to a water tank and pump. Water droplets are introduced by ducting into the inlet. Airflow control to maintain maximum efficiency is accommodated by angular adjustment of stator blades within the sealed chamber of the gas turbine engine, by means of gearing externally mounted thereon to variably limit air flow in combination with control over the air inflow temperature during water-fog injection.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 3 is a partial side section view of the gas turbine engine of the facility diagrammed in FIG. 1;

FIG. 4 is a partial section view taken substantially through a plane indicated by section line 4—4 in FIG. 3;

FIG. 5 is a partial section view taken substantial through a plane indicated by section line 5—5 in FIG. 4;

FIG. 6 is a partial plan view as seen from section line 6—6 in FIG. 4;

DETAILED DESCRIPTION OF PREFERRED EMBODIMENT

Figure 1:
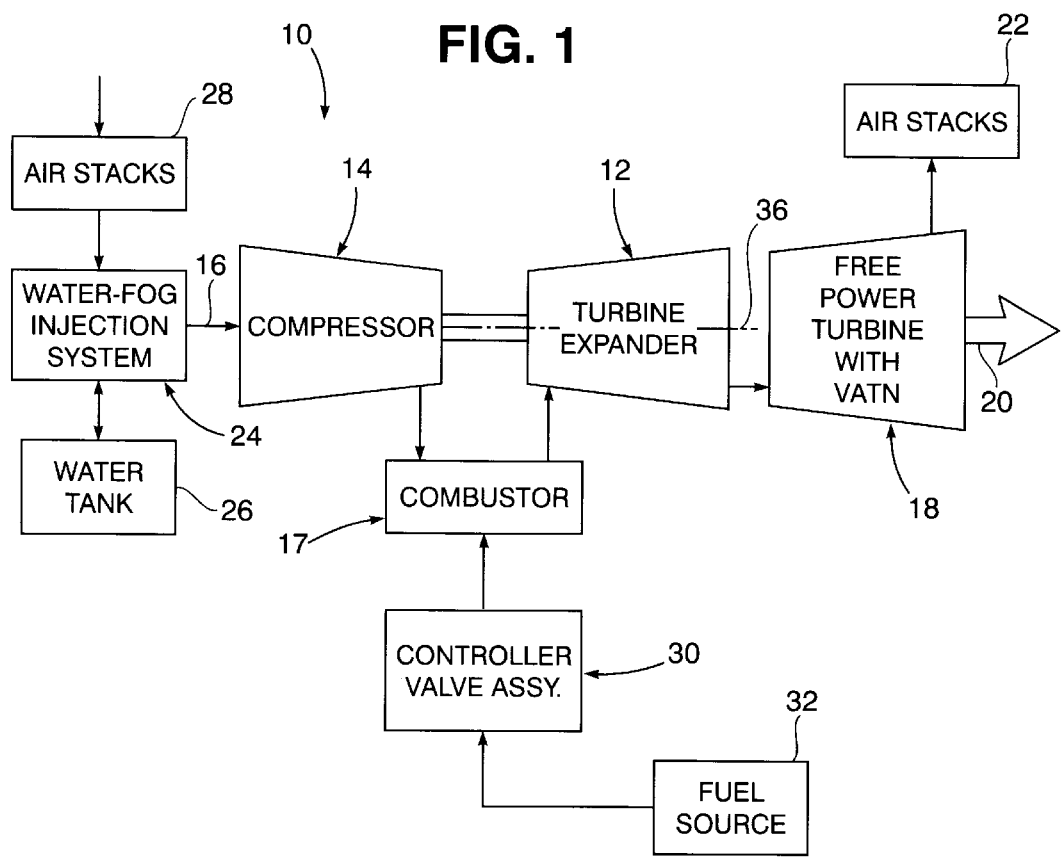
FIG. 1 is a schematic diagram of a gas turbine power generation facility in accordance with one embodiment of the present invention.

Referring now to the drawing in detail, FIG. 1 diagrams a gas turbine power generation facility, generally referred to by reference numeral 10, which includes a gas turbine expander 12 having an axial flow compressor section 14 associated therewith to which a fluid inlet duct 16 is connected. Combustion gas generated in a combustor 17 expands through the gas turbine expander 12 and is applied to a power turbine 18 having variable-area turbine nozzles (VATN) and from which a power shaft 20 extends. An outflow of exhaust air from the power turbine 18 is ducted through air stacks 22. The fluid inlet duct 16 connects the compressor section 14 to a water-fog injection system 24 as shown in greater detail in FIG. 2, with which a water tank 26 is associated. Water droplets derived from tank 26 are added to the inflow of air received through air stacks 28 to reduce temperature. A mixture of water vapor and droplets, and air is thereby supplied, as diagrammed in FIG. 1, to the compressor section 14 through its inlet for increased air density mass flow and enhanced temperature reduction purposes.

Water droplets are known to damage turbine blades. However, water droplets small enough to form a fog in a water-fog injection system 24 are carried by viscous shearing forces through high-"g" turns. Formation of the droplets in the system 24 is based on a known method of water atomization, involving use of heated pressurized water to produce droplets of reduced size which follow the flow without blade damage. Pursuant to the present invention however, water pressurized at 2000 psi, is heated to 325° F. through heat transfer from effluent waste heat. Droplet size of approximately 4 to 10 microns in diameter is thereby obtained under a pressure low enough to avoid boiler code inspection cost.

Also diagrammed in FIG. 1 is a controller 30 through which the supply of fuel from a source 32 to the combustor 17 and the gas turbine expander 12 is controlled in accordance with the present invention. FIGS. 3, 4, 5 and 6 illustrate certain details of the gas turbine expander 12 through which such control thereover is adjusted to maintain high operational efficiency as hereinafter explained.

Figure 7:
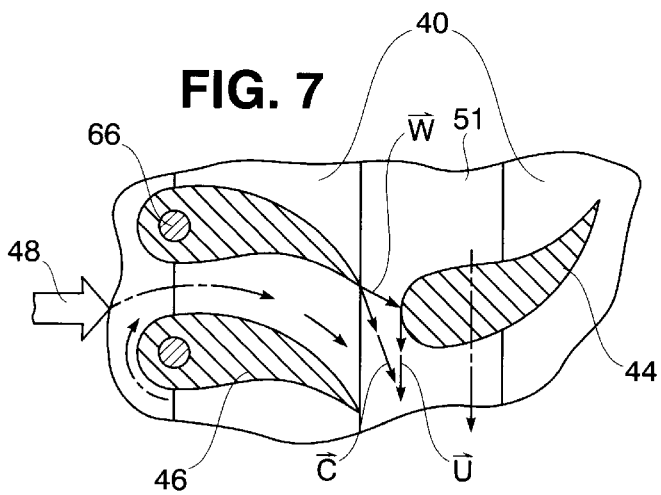
FIG. 7 is a partial internal section view taken substantially through a plane indicated by section line 7—7 in FIG. 3.

Referring now to FIG. 3, a wall portion 34 of the outer cylindrical housing of the gas turbine expander 12 is shown having a radially increasing diameter about the axis 36 of the turbine engine shaft 38. Within such outer housing enclosed by the wall 34 is a cylindrical inner wall 40 having a substantially constant radial spacing from the turbine engine shaft 38. The turbine engine shaft 38 is surrounded by a pressure sealed chamber 42 enclosed by the inner and outer walls 40 and 34. The shaft 38 is fixed to sets of circumferentially spaced rotor blades 44 connected to the shaft 38 by elements 45 extending through a slot 51 in the wall 40 as also shown in FIG. 3. Disposed in close axial spaced relation to and in front of such sets of rotor blades 44 within the chamber 42 are sets of stator blades 46. Struts 47 extend radially from the inner wall 40 to a sleeve 49 through which the shaft 38 rotatably extends within an inner chamber 52 as shown in FIGS. 3 and 7 for support of the inner wall 40 about the shaft 38. Axial flow 48 of combustion gas products through the outer chamber 42 perpendicular to the rotor blades 44 is derived from the air and water fed through the inlet 16 and the fuel from the fuel source 32. Such flow 48 through the outer chamber 42 occurs during rotation of the rotor blades 44 while a cooling flow, denoted by arrow 50 in FIG. 3, occurs through the radially inner chamber 52 in fluid communication with the chamber 42 through the slot 51 in the radially inner wall 40. Angular adjustment of the stator blades 46 is effected through activator assemblies 54 as shown in FIGS. 3, 4, 5 and 6.

Each of the actuator assemblies 54 for a set of stator blades 46 includes an annular collar 56 supported for angular rotational displacement on the outer wall 34 by a collar channel guide 58 fixed thereto. Circumferentially spaced openings 60, as shown in FIGS. 4 and 6, are formed in one of the sides of the channel guide 58 through which gear teeth 62 on the annular collar 56 are exposed for meshing engagement with an angularly displaceable sector gear 64 connected to the end of a pivot shaft 66 extending through a gas sealing bearing 68 in the outer turbine wall 34. Each of the pivot shafts 66 is connected to a stator blade 46 as shown in FIG. 4 for angular adjustment thereof in response to displacement of the annular collar 56. Such angular displacement of the collar 56 is effected by selectively controlled pressurization of hydraulic actuating cylinder 70 from which a piston rod 72 extends as shown in FIG. 4. The piston rod 72 is connected to the rotatable collar 56 by a pivot connecting hinge 74. By such adjustment of the angular positions of the stator blades 46 air flow is limited to thereby accommodate performance under optimum efficiency of the gas turbine power facility 10 under different conditions in cooperation with algorithmic control over fuel supply through the controller valve assembly 30 and control exercised through water-fog injection system 24 to avoid erosive blade impact by maximizing safe diameter for the water droplets to less than 10 microns and mixed with the air fed to the inlet 16 of the compressor 14.

Figure 2:
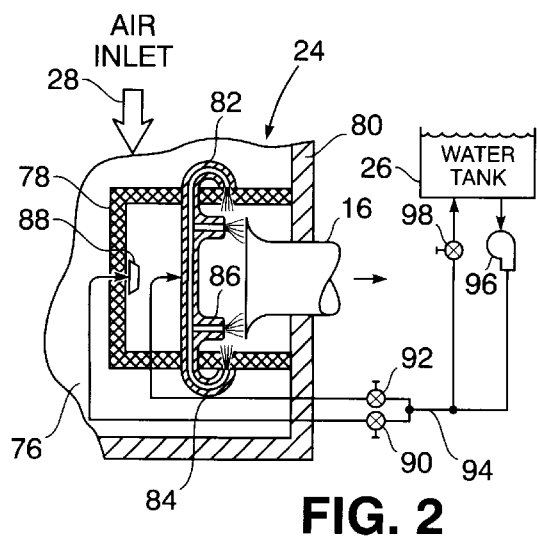
FIG. 2 is a partial sectional view of the water-fog injection system forming part of the facility diagrammed in FIG. 1.

As shown in FIG. 2, the injection system 24 utilized includes an inlet plenum 76 to which the air is supplied from air inlet 28. A screen 78 forming an enclosure is fixed to one wall 80 of the plenum 76 into which a bellmouth shaped end portion of the engine inlet duct 16 extends. Disposed within the screen enclosure 78 is a water spray manifold 82 from which a plurality of spray droplet nozzles project to direct sprays of the water droplets toward the inlet duct 16. Such nozzles include end nozzles 84 located outside of the screen enclosure directing the water sprays into the enclosure through its screen. The other intermediate nozzles 86 are located entirely within the screen enclosure. An additional spray of water droplets is also injected into the screen enclosure through a nozzle 88. The nozzle 88 and the manifold 82 are respectively connected through valves 90 and 92 to a common water supply line 94 directly connected to the water tank 26 through a valve 96. Water is returned to the tank 26 from the common line 94 through a by-pass valve 98. The water injection rate of the fluid fed through the inlet duct 16 to the turbine engine compressor 14 is thereby regulated without damage to its compressor blades for maintaining a steady turbine-inlet temperature.

Heretofore, gas turbines were instrumented with engine tachometers, accelerometers, ambient temperature thermometers and pressure gauges in association with controllers algorithmically computing levels of blade stress and to prevent overspeed damage by reducing fuel flow. In view of the arrangement of the present invention as hereinbefore described, the controller 30 provides new degrees of freedom through use of data from such instrumentation by algorithmic adjustment without compromising existing physical limits. Such new degrees of freedom are flow rate control for water-fog injection at the compressor inlet 16 and the angular positions of the variable area stator blades 46. The flow rate is made proportional to the airflow as computed from the engine tachometer and humidity. The water fog injection rate at inlet 16 is appropriately controlled to avoid close approach to dangerous surge margin limits. The angular relationships of the variable area stator blades 46 regulate gas flow by rotation of the rotor blades 44 into a choking condition and limit airflow at part load so that turbine inlet temperature is sustained at design level as long as possible. From computed data on high-pressure turbine inlet temperature, the controller 30 will also measure deviation of inlet temperature from such design levels and adjust the injection system 24 consistent with the other aforementioned adjustment limits. Thus, as denoted in FIG. 7 a certain relationship C=W+U is established between the absolute velocity C of the gas products, the velocity U of the rotor blades 44 and the relative velocity W of the gas products between blades. At 50% power, the velocity C decreases 25% while the blade velocity U decreases 7%.

As a result of the arrangement hereinbefore described for the power generation facility 10, a reduction in the required number of engines for a given power application may be achieved by a factor of 0.75 with an accompanying 25% decrease in initial acquisition investment cost. Also, the amount of power from output 20 of the facility 10 per unit mass of air supplied at inlet 28 may be increased so as to reduce the required operational volume of air discharged into the flow stack 22. The number of air stacks heretofore required for shipboard installation to accommodate power generation was thereby reduced by 25% under normal shipboard practice so as to increase ship stability. In addition to the foregoing advantages achieved, other advantages realized in Naval installations involved reductions in radar and infrared signatures and lowering of maintenance costs, total ownership costs and $NO_x$ emissions, as well as an increase in operational range.

Figure 8:
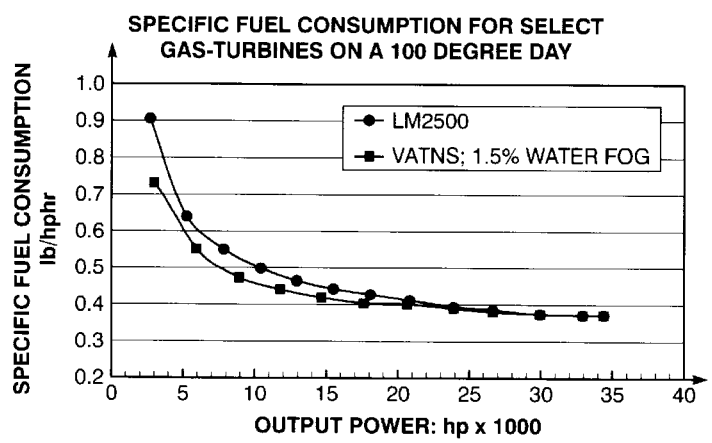
FIG. 8 is a graphical representation of operational data obtained by testing of the gas turbine engine of the present invention.

The following Table 1 lists the fuel consumption of selected engines at what constitutes an average power for certain ships as diagrammatically shown in FIG. 8. The average fuel savings for such a ship is 10.7% at 9000-hp. Range or time between underway replenishments of fuel increases 11.9%. At lower part-load powers, savings are greater.

TABLE 1

SPECIFIC FUEL CONSUMPTIONS AND RELATIVE SAVINGS
FOR THE LM2500 ENGINE AND A
WFI/VATN ENGINE IN A DDG-51 CLASS SHIP

| ENGINE | SFC; lb/hp-hr | SAVINGS % | RANGE INCREASE % |
| --- | --- | --- | --- |
| LM2500 | 0.525 | NA | NA |
| WFI/VATN | 0.469 | 10.7 | 11.9 |

The specific power of a gas turbine is the power produced per unit mass of air per second. For the foregoing engine LM2500 referred to in Table I, the specific power is about 190 hp/lb/sec. Calculated increases in both power and efficiency show a specific power increase of 25%, which exceeds the relative cost increase of the hardware enhancements. Therefore a major advantage of the invention is that the cost of new equipment with improved efficiency is lower. The cost data in Table 2 confirm that the enhanced engine of the present invention achieves its improved performance at reduced cost.

Since the specific power of an engine has increased 25%, the number of engine units necessary to achieve the same task is reduced by 25%. Standard normal maintenance is reduced and manpower requirements are reduced by 21%, which are important issues in Navy, marine and industrial application. Total ownership cost, which includes initial acquisition costs, operational cost and fuel costs is reduced by more than 19%.

TABLE 2

A COMPARISON OF INSTALLED COSTS FOR SELECTED ENGINES

| ENGINE | LM2500 | WFI/VATN |
| --- | --- | --- |
| Number of Units | 4 | 3 |
| Engines Installed | 28800 | 21600 |
| Augmented Free Power Turbine | 0 | 450 |
| VATNs | 0 | 600 |
| Reverse Osmosis Plant; 15000 gpd | 0 | 400 |
| Commercial Cost | 28800 | 22800 |

With efficiency increases at design load, plus a 25% reduction in the number of engine units, air requirements decrease by 30%. Stacks are then 30% lighter and smaller in volume. The installation cost of heavy battle-resistant steel stacks is reduced by 30%. Table 2 data does not include the high cost of stack installation in the Navy and marine environments, which favors the engine of the present invention.

With lower stack weight the naval architect can achieve a lower center of gravity, which improves seakeeping for ships under severe weather conditions. This is especially fortunate when Navy ships are operating under tactical conditions.

Since the smaller stacks reduce radar signatures by 15% and infrared signatures by 17%, the survivability of Navy ships is enhanced.

A general recommendation of original equipment manufacturers for reducing fuel consumption is to encourage the acquisition of smaller gas turbine with lower power output. However, the capital cost of small engines per kilowatt of power increases as power falls off. FIG. 8 graphically shows that the fuel consumption can indeed be more frugal for engines operating at part-load power.

Recently published thermodynamic gas-turbine data show losses of power exceeding 24% and efficiency losses up to 6% as the ambient temperature rises from 59° F. to 100° F., reflecting a serious problem in power production on hot days. According to published data on cooling, the inlet water-fog injection effects recovery from this loss of power and efficiency. FIG. 1 shows the configuration of water fog injection relative to the compressor inlet 16. Thus on a 100° F. day water fog injection effects the achievement of power and efficiency. Adding additional water-fog injection devices increases the power and efficiency.

Fuel throttle controls the power output of a gas turbine by metering fuel as required by the load. In reducing fuel flow from the maximum design power, fuel flow decreases faster than the airflow in gas turbines. Therefore the turbine inlet temperature falls and the overall turbine efficiency falls.

Figure 9:
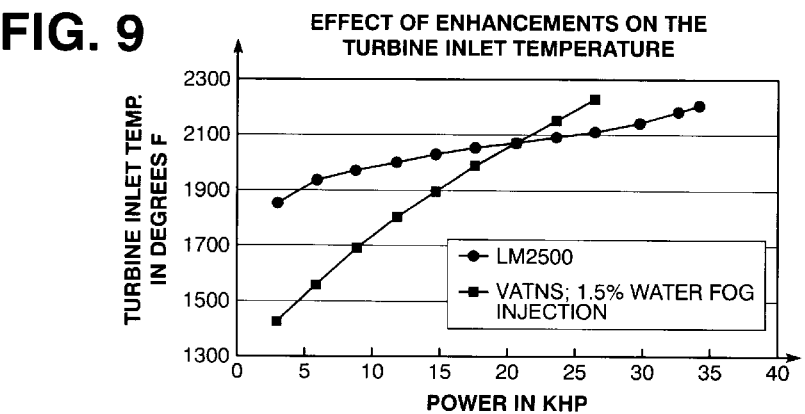
FIG. 9 is a graphical representation of the effects of water fog injection and variable area turbine nozzles.

Rotational adjustment of turbine stator vanes, is used to adjust gas flow at off-design conditions. Such adjustment of the turbine vanes in the free-power turbine restricts the airflow. In order to meet the required output power, the controller 30 releases more fuel, which increases the fuel-air ratio, the turbine inlet temperature and therefore the overall thermodynamic efficiency. As diagrammatically shown in FIG. 9, simulated analyses exhibit a flatness in the turbine inlet temperature not obtained without the combination of water fog and variable area turbine nozzles.

Although water-fog injection alone increases the maximum power at full load, the efficiency increase is only modest at part load. Studies of variable area turbine nozzles show that part-load efficiency enhancements may be up only 2.8% at 50% load. According to such studies variable area turbine nozzles are commercially viable only when used with recuperative systems. However, when variable area nozzles together with water-fog injection and the controller 30, contrived to maintain the highest practical turbine inlet temperature are synergistically joined, the improvements of the present invention increases the efficiency over 10.7% in the important 9000-hp range of LM2500 gas turbines and more at lower loads. Since the cost of implementing the present invention is less then the cost for a 25% increase in power, the synergistic combination of water-fog injection, use of variable area turbine nozzles and controls associated therewith delivers more efficient power at a lost cost.

The present invention thus relates to depression of gas turbine power and efficiency in ships and utilities as the ambient temperature rises above standard conditions. When a predetermined amount of water, calculated to pre-cool the airflow by evaporative cooling is sprayed as a fog into the inlet, both the power and efficiency expand on critical hot days. Enhancement of efficiency at full power for water-fog injection alone with fully open VATN is 6%. Performance at part power does not exhibit any further enhancements because the fuel-air ratio and the turbine inlet temperature fall off. However, when controller 30 restricts the airflow through the variable area turbine nozzles, the fuel-air ratio and turbine inlet temperature are elevated towards the design point condition. Thus, power and efficiency grow dramatically, and efficiency at critical part loads is increased.

In essence, the present invention in combining water-fog injection, variable area turbine nozzles and a controller to expand gas turbine power, increases more rapidly than the cost of the relatively simple hardware enhancements. As a consequence, the present invention renders the gas turbine more attractive in the marketplace because it offers, simultaneously, higher power and higher efficiency at lower dollars per kilowatt.

Obviously, other modifications and variations of the present invention may be possible in light of the foregoing teachings. It is therefore to be understood that within the scope of the appended claims the invention may be practiced otherwise than as specifically described.

What is claimed is:

1. In a gas turbine engine to which pressurized water and air is supplied by a compressor from an inlet, said turbine engine including turbine stages within which rotor and stator blades are located and to which the pressurized water and air is fed from the compressor through a combustor, the improvement residing in: regulational means for introduction of the water in droplet form into the air supplied to the compressor to reduce temperature therein and increase mass flow within the turbine engine; and means for angularly adjusting said stator blades within the turbine engine to control inflow of the water and the air from the inlet and optimize operational efficiency of the turbine engine by maximizing inlet temperature while the water is introduced to the compressor by the regulational means.

2. The combination as defined in claim 1, wherein said regulation means includes: an inlet plenum to which the air is supplied; screen means fixed within said plenum for establishing an enclosure therein into which said air and the water droplets are received; and nozzle means for directing said introduction of the water droplets into the enclosure both internally thereof and externally through the screen means.

3. The combination as defined in claim 2, wherein said means for angularly adjusting the stator blades includes: pivot means for mounting the stator blades in spaced relation to each other within a sealed chamber; activator means located externally of the turbine engine for inducing adjustment motion; and gear means operatively interconnecting the activator means with the pivot means for translating said adjustment motion into angular displacement of the stator blades.

4. In combination with a gas turbine engine within which pressurized gas is expanded supplied thereto by a compressor and a combustor from an air inlet and a source of fuel, said turbine engine including a chamber within which rotor and stator blades are located and to which the pressurized gas is fed from the combustor, the improvement residing in: controller means connected to the source of fuel and the combustor for regulated supply of the fuel to energize the turbine engine with a predetermined ratio of water mixed with the air being pressurized in the compressor; regulational means for introducing the water in droplet form to the compressor; and means for angularly adjusting said stator blades within the chamber of the turbine engine, for maintaining maximum inlet temperature to optimize operational efficiency of the turbine engine while receiving the water and the air at said predetermined ratio.

5. The combination as defined in claim 4, wherein said means for angularly adjusting the stator blades includes: pivot means for mounting the stator blades in spaced relation to each other within the chamber; activator means located externally of the turbine engine for inducing adjustment motion; and gear means operatively interconnecting the activator means with the pivot means for translating said adjustment motion into angular displacement of the stator blades.

6. The combination as defined in claim 5, wherein said regulation means includes: an inlet plenum to which the air is supplied; screen means fixed within said plenum to form an enclosure therein into which an inflow of the supplied air and the water occurs; and spray nozzle means for supplying said inflow of the water into the enclosure both internally thereof and externally through the screen means.

7. The combination as defined in claim 4, wherein said regulation means includes: an inlet plenum to which the air is supplied; screen means fixed within said plenum to form an enclosure therein into which an inflow of the supplied air and the water occurs; and spray nozzle means for supplying said inflow of the water into the enclosure both internally thereof and externally through the screen means.

8. The combination as defined in claim 1, wherein the pressurized water and air is mixed with combustion gas from the combustor to undergo expansion within the turbine engine.

* * * * *